United States Patent
Zukerman et al.

(10) Patent No.: US 10,437,914 B2
(45) Date of Patent: Oct. 8, 2019

(54) CREATING HTML LAYOUTS BASED ON CLIENT INPUT AND PROCESSING

(71) Applicant: Go Daddy Operating Company, LLC, Scottsdale, AZ (US)

(72) Inventors: Erez Zukerman, Ontario (CA); Maksims Gladkovs, Riga (LV); Seth Rapps, Jerusalem (IL); Sascha Michael Trinkaus, Cologne (DE); Shawn Steele, Marion, SD (US); Dalibor Nasevic, Belgrade (RS)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

(21) Appl. No.: 15/860,130

(22) Filed: Jan. 2, 2018

(65) Prior Publication Data
US 2019/0205364 A1   Jul. 4, 2019

(51) Int. Cl.
*G06F 17/00* (2019.01)
*G06F 17/21* (2006.01)
*G06F 17/22* (2006.01)
*G06F 17/24* (2006.01)
*G06F 16/958* (2019.01)

(52) U.S. Cl.
CPC .......... *G06F 17/212* (2013.01); *G06F 16/986* (2019.01); *G06F 17/2247* (2013.01); *G06F 17/248* (2013.01)

(58) Field of Classification Search
CPC .............................. G06F 17/3089; G06F 17/24
See application file for complete search history.

(56) References Cited

U.S. PATENT DOCUMENTS

| | | | |
|---|---|---|---|
| 8,245,145 B1* | 8/2012 | Eakin | G06F 17/3089 715/760 |
| 2002/0116418 A1 | 8/2002 | Lachhwani et al. | |
| 2011/0167336 A1* | 7/2011 | Aitken | G06F 3/0486 715/239 |
| 2013/0051683 A1 | 2/2013 | Tanaka | |
| 2014/0365993 A1* | 12/2014 | Rath | A63F 13/65 717/105 |
| 2015/0310122 A1 | 10/2015 | Hall | |
| 2017/0286378 A1 | 10/2017 | Guarnieri et al. | |
| 2018/0203578 A1 | 7/2018 | Murphy | |

* cited by examiner

*Primary Examiner* — Andrew T McIntosh
(74) *Attorney, Agent, or Firm* — Greenberg Traurig, LLP

(57) ABSTRACT

Systems and methods of the present invention provide for one or more server computers communicatively coupled to a network and configured to receive a web page, email campaign, and/or desktop publishing document from a client, which has captured a digital image of a hand drawn layout including shapes and/or symbols, and selected a matching shape or symbol defined in a database, which is used to create a content component for an web page, email campaign or desktop publishing template GUI, which a user accesses and edits. The web page or email campaign/desktop publishing document template is then stored within the database.

18 Claims, 8 Drawing Sheets

CREATING HTML LAYOUTS BASED ON CLIENT INPUT AND PROCESSING

FIELD OF THE INVENTION

The present invention generally relates to the field of electronic layouts and specifically to the field of creating electronic layouts, such as HyperText Markup Language (HTML) email or web page layouts, and an interactive graphical user interface (GUI) according to a visual input, such as a photograph of a drawing of the layout.

SUMMARY OF THE INVENTION

In some embodiments, the present invention provides systems and methods comprising one or more server hardware computing devices coupled to a network and configured to: receive a digital image of a hand drawn web page layout from a client including shapes and/or symbols, and select a matching shape or symbol defined in a database, which is used to create a content component for a web page GUI, which a user accesses and edits. The web page is then hosted on the server.

In some embodiments, the present invention provides systems and methods comprising one or more server hardware computing devices coupled to a network and configured to: receive a digital image of a hand drawn email campaign or desktop publishing layout from a client including shapes and/or symbols, and select a matching shape or symbol defined in a database, which is used to create a content component for an email campaign or desktop publishing template GUI, which a user accesses and edits. The template is then stored within the database.

In some embodiments, the present invention provides systems and methods comprising one or more server hardware computing devices coupled to a network and configured to: receive a web page, email campaign, and/or desktop publishing document from a client, which has captured a digital image of a hand drawn layout including shapes and/or symbols, and selected a matching shape or symbol defined in a database, which is used to create a content component for an web page, email campaign or desktop publishing template GUI, which a user accesses and edits. The web page or email campaign/desktop publishing document template is then stored within the database.

The above features and advantages of the present invention will be better understood from the following detailed description taken in conjunction with the accompanying drawings.

DETAILED DESCRIPTION

Figure 1:
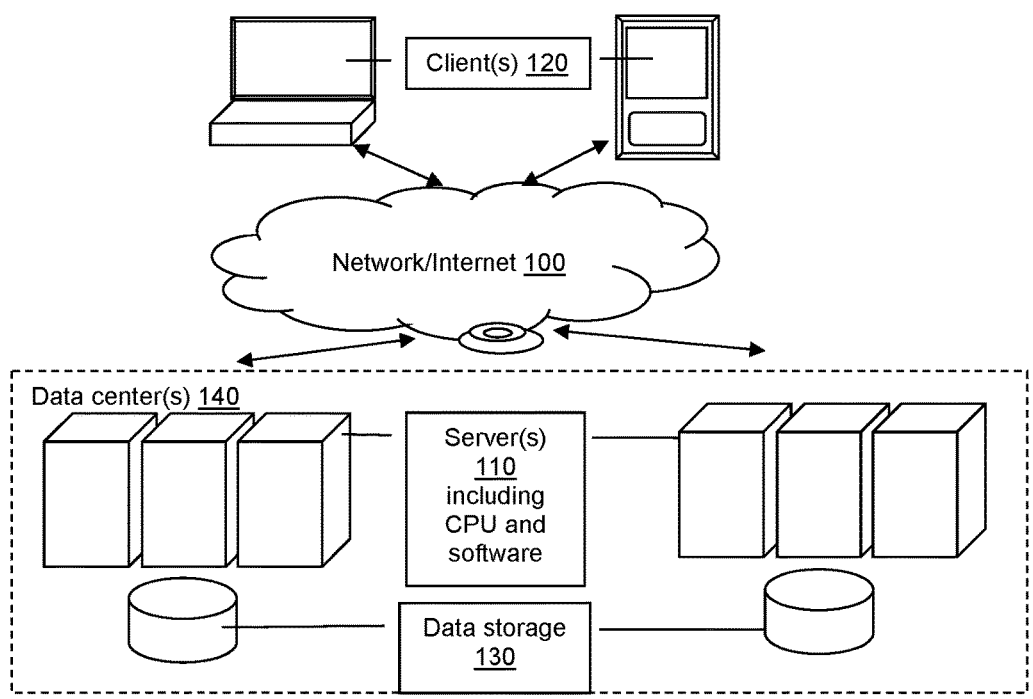
FIG. 1 illustrates a possible system for creating electronic layouts based on visual input.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

A user operating a client computer may input a URL, including the domain name, into a browser running on a client computer. In response, the browser transmits a request to the web server hosting the multimedia website at the unique IP address associated with the URL/domain name. The web server accesses, and possibly processes, the source code for a web page, resulting in a web page for display, which may include combinations of web-friendly languages such as Hypertext Markup Language (HTML) and JavaScript. The server then transmits the generated source code for the web page back to the user's browser, which interprets the source code and displays it on the display device for the user's client machine.

The information on web pages is in the form of programmed source code that the browser interprets to determine what to display on the requesting device. The source code may include document formats, objects, parameters, positioning instructions, and other code that is defined in one or more web programming or markup languages. One web programming language is HTML, and all web pages use it to some extent. HTML uses text indicators called tags to provide interpretation instructions to the browser. The tags specify the composition of design elements such as text, images, shapes, hyperlinks to other web pages, programming objects such as Java applets, form fields, tables, and other elements. The web page can be formatted for proper display on computer systems with widely varying display parameters, due to differences in screen size, resolution, processing power, and maximum download speeds.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. However, the website design process can be complicated, time-consuming, and fraught with opportunity for user error. It may also be very expensive to produce, serve, and maintain the user's website. Merchants may be hesitant to create an online presence because of the perceived effort involved to do so. These merchants limit their business to offline "brick and mortar" points of sale.

Some existing website design approaches can simplify the design process through automation of certain of the design process steps. Typically, a user is provided a template comprising a fully or substantially hard-coded framework. The user must then customize the framework by providing content, such as images, descriptive text, web page titles and internal organizational links between web pages, and element layout choices. While the resulting website may be customized to the user's preferences and may present the desired information, the design process remains complicated and time-consuming because the user must identify, locate, prepare, and upload all of the desired content and then organize it within the web pages of the website.

In a traditional model for creating such web pages within a website, or a marketing campaign such as an HTML email campaign, the developers or marketers may spend time in front of the screens at their workstations, planning or programming marketing or software projects. In a traditional model for collaborative projects, teams or other groups of marketers and/or software developers may gather in a single location such as a conference room, to brainstorm ideas for the desired email and/or web page layout, possibly using tools such as a whiteboard or electronic whiteboard, where the development team is able to capture their ideas in an electronic format and store it electronically as needed.

While traditionalists may argue that this is a solid model for collaboration, the reality is that today's environment is much more mobile; many people now carry laptops, tablets, and/or cell phones wherever they go. Another unfortunate reality of this model is that it's often easier to generate creative ideas away from a screen or conference room. Because as the team members sit at the workstation, they are almost literally staring at a miniature wall, and the creative process tends to be blocked. Creative teams may therefore get some of their best ideas when they are on the go (e.g., at lunch), possibly as they discuss matters completely unrelated to their project.

In these situations, the electronic resources may not be available to electronically capture and store the ideas. Although many people now carry cell phones or tablets wherever they go, the limited screens, memory, and processing speed may limit the ability to capture creative ideas. Even if the team is able to immediately visualize and discuss the creative idea layout (or contact someone via phone or video chat to discuss them), the limited screen size and inability to simultaneously retrieve and enter data by phone or video make it difficult to communicate the idea or collaborate face to face.

In these cases, a lower tech solution may be helpful, and even necessary. For example, it is practically a cliché for someone to draw an idea on the back of a napkin, but that is precisely what the disclosed embodiments allow the user to do, creating, then uploading, via camera or other image capture device, a sketch of the fundamental layout of the marketing campaign or HTML pages to preserve all of the ideas to be included within the electronic layout. The user or team may later return to their computers, possibly logging in to the disclosed software, to execute and build on the fundamental ideas, thereby continuing the idea at the point that they left off rather than trying to restructure and rebuild the idea from scratch.

The system in the disclosed embodiments captures (e.g., scans or takes a picture or screen shot of) a user's interpretation of a layout, such as a hand drawing on a piece of paper representing the layout for an email campaign, an HTML web page or website, a desktop publishing layout (e.g., a brochure), etc. The system then analyzes the captured layout, identifying various shapes and symbols and their relative positions within the layout, and interprets them as individual content elements. The system then creates a customized template reflecting the user's intended layout with each of the individual content elements in the positions indicated by the captured layout, and generates a GUI containing the customized template. Users may access the GUI to modify the relative positions of individual layout content components within layout, and/or may input text or multimedia content into the individual layout content components, in order to complete the email campaign, web page, brochure, etc. The final layout product may then be stored within data storage for future editing or use, or may be hosted as a web page on the server.

To accomplish the steps outlined above, a user may download and install, or otherwise access (e.g., via a web-based software displayed within a browser), a client application, including one or more software modules and associated GUI components. As described in relation to FIG. 3 below, a GUI for the client application may initially display instructions to the user for creating the layout, including identification of the shapes, symbols, and relative positions which the system recognizes in order to identify and generate the intended layout and layout components.

After reviewing the instructions, and using the symbols and positions described in the instructions, the user, and/or a team of users may create a draft of the intended layout (e.g., a hand-drawn layout for an email campaign, described below in relation to FIG. 4), and capture the image using one or more image capture software modules for accessing hardware and/or software, such as a camera or scanner, for receiving input of the user's intended layout. If the captured image is not clear, additional software may sharpen or otherwise improve the image. [maybe cover all steps here, but on client side?]

The analysis of the captured image may comprise a system utilizing any combination of software logic and stored data, executed using any combination of software instructions executed on a client hardware computing device, and/or a server hardware computing device (client and server, respectively). For example, the instructions on the client and/or server may execute instructions and/or algorithms within one or more image recognition software libraries and/or software engines that identify, within the captured image, symbols, shapes, drawings, icons, or other visual indicators (referred to herein collectively as symbols), as well as combinations of symbols, GUI controls, colors, images, etc.

The system, if needed, may then access stored data (e.g., databases, data tables, data records, data fields, unstructured data, etc.) within data storage, and use this stored data to associate the identified symbols with definitions and/or interpretations of the symbols according to data defining a symbol/shape name (e.g., rectangle, circle), description (e.g., long, narrow, thin, horizontally wide, vertically tall), positions within a layout (e.g., top, center, left), as identified by the image recognition algorithms.

The system may then utilize heuristic algorithms, in combination with the stored data, to recognize and identify the intended layout, including each of the hand drawn symbols and its position. To accomplish this, the system may identify an aspect ratio of each of the symbols, and make specific deductions. For example, the software logic may identify a horizontally wide rectangle, according to the definitions within the software logic and/or data storage, and determine that its aspect ratio within the drawing includes the entire width of the layout. Then, given its relative position within the drawing at the top of the layout, may determine, according to additional associated logic or stored data, that the user intended the rectangle to be a logo or banner.

Figure 3:
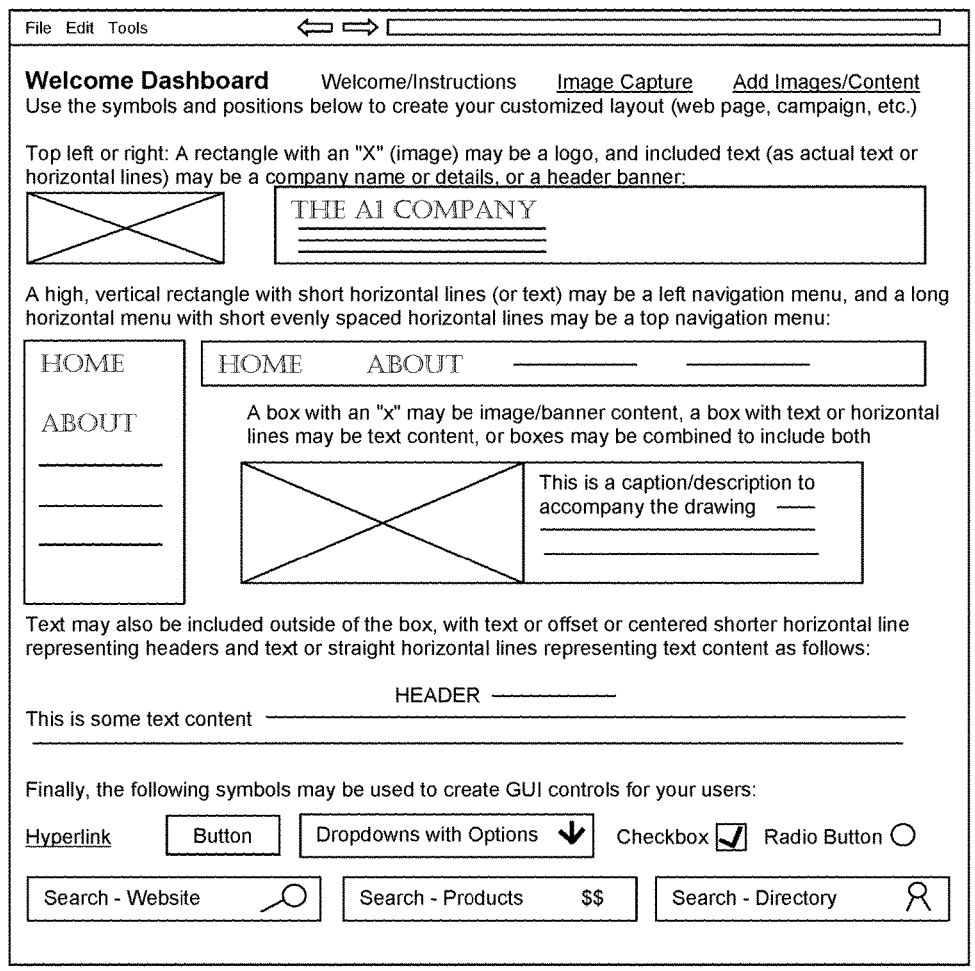
FIG. 3 is a user interface illustrating a possible embodiment for creating electronic layouts based on visual input.

The heuristic algorithms and/or stored data may also be configured to identify combinations of symbols and/or text. For example (as seen in FIGS. 3-5), a rectangle containing an X through the center may be identified and/or interpreted as an image. Similarly, multiple parallel lines inside or outside of a rectangle may represent a collection of text content. Other non-limiting examples may include symbols representing GUI controls, such an downward facing arrow within a rectangle representing a dropdown box, a checkmark within a square representing a checkbox, a circle representing a radio button, a thin horizontal rectangle including a magnifying glass representing a website search, a thin horizontal rectangle including a person icon representing a directory search, a tall rectangle centered within a long a line representing a slider, a shaded or divided rectangle representing a progress bar, etc.

Software logic and/or stored data may further include instructions for combining and organizing the one or more identified symbols into a content layout for a personalized template to be used for an email campaign, web page, brochure, or any other intended electronic document layout. Utilizing these instructions, the system may then automatically generate the content layout according to each symbol's defined position in relation to itself, the layout, and to other symbols.

In some embodiments, the software logic and/or stored instructions may further include one or more text recognition software libraries, modules, and/or engines, which may identify text within the captured layout image, as provided by the user and/or the user's team, and may insert the recognized text as content into the appropriate component of the content layout. Similarly, the server may recognize specific colors within the captured layout, and include these colors within the automatically generated content layout.

In some embodiments, the captured image may include keywords, a logo, an image (e.g., for a product), a color scheme, or other data specific to a particular industry, organization, and/or product. In these embodiments, data storage may store data associated with the industry, organization, and/or product (e.g., associated images, stock text content, color schemes, previous layouts, etc.). In these embodiments, the software logic may attempt to match the keyword(s), logo, image, color scheme, etc. in the captured layout with the stored data. If a match is found, the software logic may attempt to insert the matched data as content into the appropriate components of the content layout. The system may then generate a GUI, transmitted to and displayed on the user's client computer, allowing the user to edit the automatically generated content layout.

Each of the content layout components within the GUI, representing each of the identified symbols, may be positioned according to the relative positioning of the original captured image layout. In embodiments where the user input text, color schemes, product images, etc., the software instructions may automatically insert the appropriate text, images, logos, product descriptions, color schemes, etc.

The generated GUI may allow for the user to re-position, as needed or desired, each of the components of the layout. The generated GUI may further include instructions, icons, links, etc. indicating to the user content areas into which the user may insert or update content (e.g., text, image, etc.), within the selected component.

For example, if the system identifies the component as a text component, a user may select a link or icon indicating that the user desires to insert text. On receiving this input, one or more text entry software instructions may generate a GUI control, such as a text area, within the layout (seen in FIG. 5), and automatically access a keyboard or voice recognition software to generate a user interface allowing the user to input the text to be stored in the text component of the layout.

Similarly, if the system identifies the component as an image component, the user may select a link or icon to insert an image. On receiving this input, one or more image selection or capture software instructions may generate a GUI control, such as a dialog box, allowing the user to capture an image via a camera or scanning software, or to select an image from a local client machine or a cloud-based solution.

The user may repeat this process for each of the layout components, and when satisfied with the final result, submit the content layout to be stored in data storage and/or hosted on one or more servers. The user may then access this template to complete an email campaign, an HTML web page or site, a brochure, etc.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

The disclosed system environment includes a network 100, connecting various components of the system via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to create HTML layouts based on image recognition.

Server(s) 110 may comprise any computer or program that provides services to other computers, programs, or users either in the same computer or over a computer network 100. As non-limiting examples, the server 110 may comprise application, communication, mail, database, proxy, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX, Kotlin, Java, Swift, ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
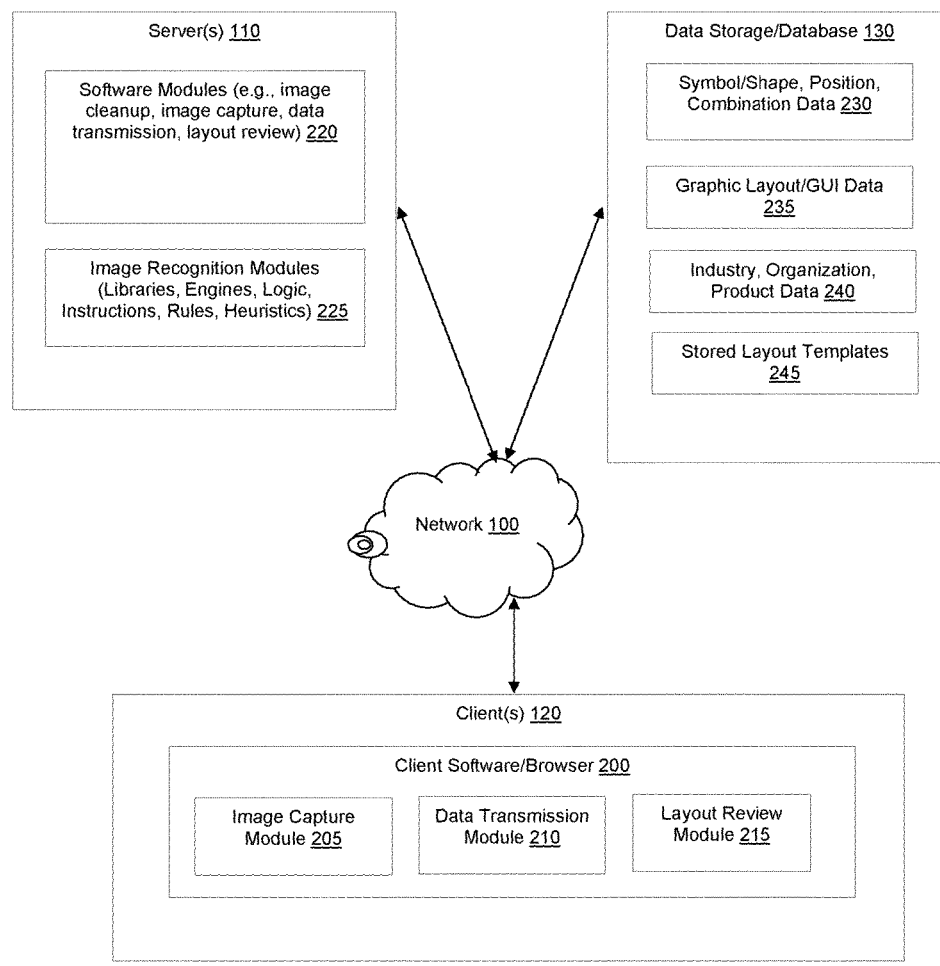
FIG. 2 illustrates a more detailed possible system for creating electronic layouts based on visual input.

FIG. 2 shows a more detailed example embodiment of an environment for the systems, and for accomplishing the method steps, disclosed herein. It is important to note FIG. 2 represents one example of the an environment in which the disclosed system and software are executed. However, this non-limiting example embodiment should in no way limit the possible embodiments for the invention. The disclosed software modules may be run and executed on any combination of server 110 and client 120.

For example, in FIG. 2, all disclosed software modules may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software 200, using data in data storage 130 associated with the software modules 200.

However, in other embodiments, client-side software may be installed and run on one or more client hardware computing devices (referred to herein as client 120), which receives user input via user interfaces, and client 120 executes the administration of the software 200, 220, 225, using data stored either locally on client 120, on one or more server hardware computing devices (referred to herein as server 110), or in any data storage 130 communicatively coupled to network. 100. Thus, the disclosed system may be configured to execute any or all of the method steps disclosed herein, and may further execute these method steps using stored data and/or software logic running and executed on any combination of client 120 and server 110.

Server(s) 110 may be hosted by any entity, possibly a hosting provider, a domain name registrar, a website development company, any other software service provider or any combination thereof.

Figure 4:
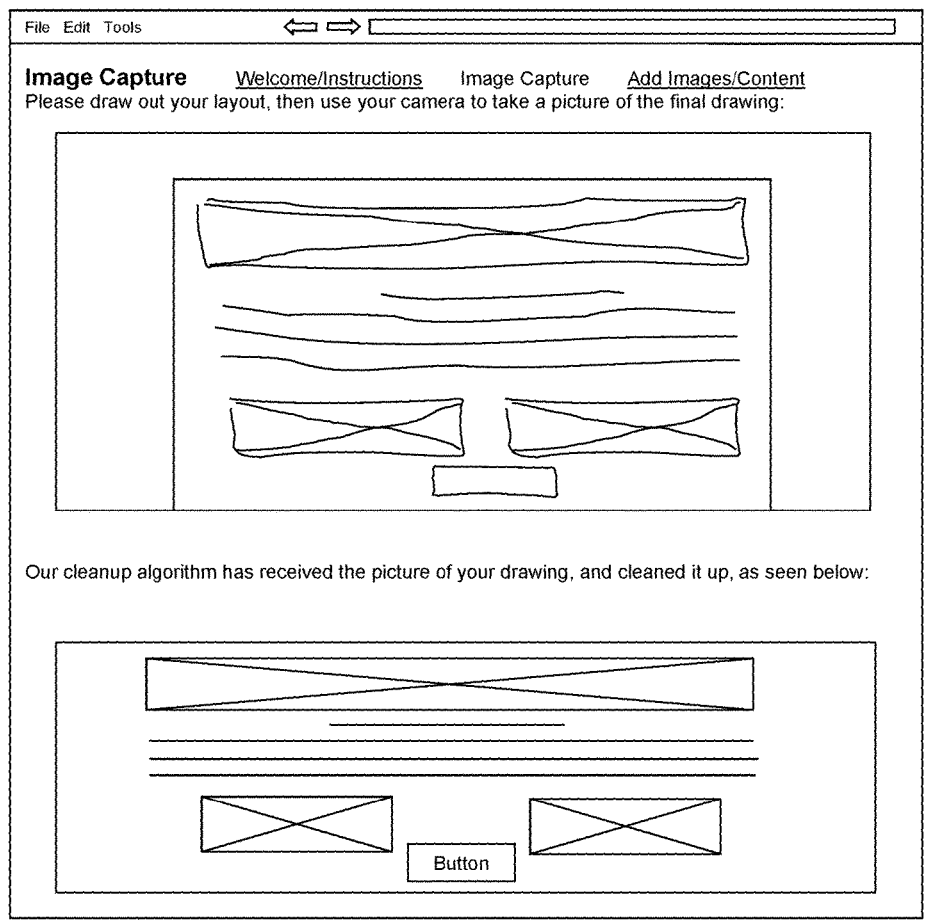
FIG. 4 is a user interface illustrating a possible embodiment for creating electronic layouts based on visual input.
Figure 5:
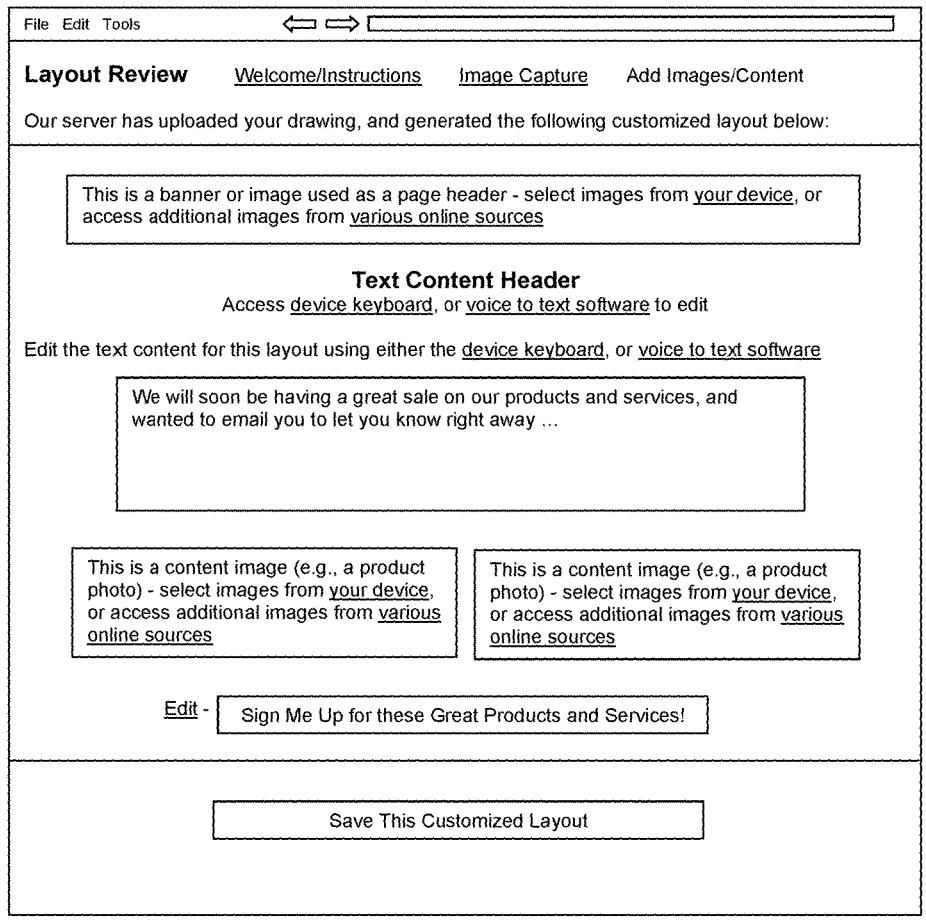
FIG. 5 is a user interface illustrating a possible embodiment for creating electronic layouts based on visual input.

Turning now to FIGS. 3-5, a user may download and install, or otherwise access (e.g., via a browser-based website solution), a client-side software application, including one or more software modules. These software modules, along with their associated GUI components, may be configured to acquire an image, process it according to the method steps disclosed below, and generate a preview of an electronic document. In some embodiments, the client-side software application may perform all of the disclosed steps, receive approval from the user, then transmit the generated electronic document, including content layout and any additional content, to server 110 for storage and/or hosting. In still other embodiments, the client-side software may acquire the image, and transmit an image of a layout to server 110, and subsequent method steps may be executed on server 110. In some embodiments, the disclosed method steps may be executed by software running and executed on any combination of server 110 and client 120. As non-limiting examples, the layout received within the acquired image may represent any project, such as email campaign, an HTML layout of a webpage and/or website, or a desktop publishing document such as a brochure.

Turning now to FIGS. 2 and 3, the software 200, 220 on client 120 may display a GUI providing instructions to the user for creating the layout, including identification of the shapes, symbols, and relative positions that the system recognizes to identify and generate the intended layout and layout components. Thus, once installed on client 120, the software application 200 may generate and display instructions for the application's use.

As seen in FIG. 3, these instructions may include, for example, instructions to draw and position various symbols or shapes available for use, as well the significance of the positions of one or more of these symbols in the layout. In some embodiments, the instructions may be dynamically generated according to instruction or layout data 230, 235 stored in data storage 130 (discussed in more detail below), providing examples of each symbol and associated instructions or definitions, etc. The instructions may further inform the user that they may freely combine any number of symbols, images, text, multimedia, or other content in any relative positions, in order to create a personalized layout/template for their project.

After reviewing the instructions, and using the symbols and positions described in the instructions, the user, and/or a design team of users may create a draft of the intended layout (e.g., a hand-drawn layout for an email campaign). The user, and any additional team members, may therefore ideate, iterate, and collaborate to create a visual layout on any surface (e.g., a piece of paper, a napkin, a whiteboard, etc.), depicting the various elements of a visual composition. For example, the designers could sketch out the placement of a visual layout on a piece of paper, depicting and freely combining the various elements of a visual composition, including a header, image placeholders, title placeholders, text placeholders, etc. By using the disclosed embodiments, users may quickly visualize and create visual designs offline using traditional, analog tools with a very low learning curve (e.g., using rectangles, a shape often used to sketch such layouts).

FIG. 4 illustrates a possible visual layout created by the team members. This non-limiting example includes a header, image placeholders, title placeholders, text placeholders, product details (e.g., titles, images, and text, possibly for a product), banners (e.g., logos, ads), etc. However, this example is non-limiting: users may freely combine any number of available symbols or shapes in any combination at any position. In the example embodiment seen in FIG. 4, the users have, in a collaborative manner, composed/sketched an email design for an email campaign to be displayed in HTML.

As seen in FIG. 3, in addition to fundamental symbols or shapes, the user or design team may include and/or mark up additional content to be recognized by the identification/recognition software instructions 220, 225 executed by client-side software 200 on client 120, and/or on server 110, as described herein. As non-limiting examples, this additional content may include: text descriptions or other text content; combinations of symbols, shapes, and/or text to be included as images; links; GUI controls; colors or color schemes to be reflected in the layout; industry keywords and/or logos, product images; etc.

The client application 200 may include multiple software modules, including at least an image capture software module 205, 220 a data transmission software module 210, 220 and a layout review software module 215, 220 which may, in turn include one or more image selection software modules, and one or more text input software modules. As noted above, in some embodiments, client software 200 may also include software modules 220, 225, as well as any combination of local or network-accessible data storage 130, allowing all disclosed method steps to be executed on client 120, and presenting the resulting layout for review by the user(s) for correction before storing within database 130 and/or hosting on server 110.

As seen in FIG. 4, the image capture software module 205, running on client 120 and/or server 110, may be used to input the user's intended layout via software access to a camera, scanner, screenshot, or other image capture functionality accessible via client 120, which may receive and capture the input including an image of the intended layout. Thus, once the user or design team is satisfied with the look of the physical "pen-and-paper" layout, they may then access the image capture software 205 from within the client application GUI 200 and upload the image of the visually depicted layout.

In some embodiments, the photo may include an image of a product to be included, and/or a logo associated with an organization for which the layout designers are designing the layout, in order to capture a color scheme, or fonts, as non-limiting examples, to be included in the customized/personalized template for the captured layout.

If the captured image is not clear, additional software modules (e.g., 220), executed using any combination of client 120 and server 110, may sharpen or otherwise improve the image. The client and/or server software 200, 220 may optically clean and sharpen the image for better processing, using any means of sharpening or cleaning images known in the art, in order to improve the created features and make them clearer.

In embodiments where all software modules 200, 220, 225 are executed by client 120 and/or a combination of client 120 and server 110, the software modules 200, 220, 225 may receive the transmitted image for analysis and processing. Otherwise, the data transmission software module 210 may automatically upload or otherwise transmit the captured layout image to additional software modules 220, 225 running on any combination of server 110 and client 120, which receive the transmitted image depicting the layout, for analysis and processing.

The analysis of the image may utilize any combination of software logic 220, 225 and stored data 230, 235. As non-limiting examples, the instructions within this software may include an image sharpening module to make clear hand drawn images received by the system, one or more image recognition or capture libraries, one or more software engines, including the associated software rules and/or one or more proprietary or commercial heuristic algorithms that perform shape recognition and provide algorithmic translation and/or interpretation of the symbols within the captured layout, as well as the positions of the symbols, in order to identify the layout intended by user(s). In some embodiments, the data used to make these determinations 230, 235 may be stored in data storage 130. In some embodiments, this data may be stored in a local database stored on client 120 (not shown), possibly within client software 200, and/or in combination with data storage 130. It should again be noted that although FIG. 2 illustrates a non-limiting example embodiment wherein this data is stored exclusively within database 130, this data may be stored and/or accessed anywhere within the disclosed system. This data may define a plurality of symbols, symbol combinations, layouts, layout components, layout component positions, etc., possibly including at least some software instructions or rules for identifying them and inserting into customized and personalized templates, as described below.

The software instructions or logic may execute algorithms to translate and interpret the shapes within a captured image, by identifying, within the software logic or stored data, one or more symbols or shapes stored in data storage that match the identified symbols or shapes in the captured image. Thus, server 110 and/or client 120 may host, run, and/or execute instructions and/or algorithms within one or more image recognition software libraries and/or software engines 220, 225, which make specific deductions, and perform the appropriate recognition, associating stored symbols with specific captured layout features in order to identify, within the captured image, symbols, shapes, drawings, icons, or other visual indicators (symbols), combinations of symbols, GUI controls, colors, images, etc., thereby resolving the captured and received image to a collection of symbols, text, keywords, colors, and images (e.g., a logo or product image). The software modules 220, 225 may be any combination of proprietary or commercial third party, open source, or other software libraries or software modules. As a non-limiting example, these software examples may include open source solutions, such as OPENCV.

The disclosed system, if needed, may then access stored data (e.g., databases, data tables, data records, data fields, unstructured data, etc.) within data storage and/or stored locally on client 120, and use this stored data 230, 235 to associate the identified symbols with definitions and/or interpretations of the symbol according to data defining a symbol name (e.g., rectangle, circle), description (e.g., long, narrow, thin, horizontally wide, vertically tall), positions within a layout (e.g., top, center, left), as identified by the image recognition algorithms 225.

The system may then utilize and apply heuristic algorithms 225 to the identified symbols, in combination with the stored data 230, 235, in order to recognize and identify the intended layout, including each symbol and its position, according to the relative size or positions of each of the hand drawn symbols, in order to determine the layout and the role of each symbol or other content within the layout. To accomplish this, the heuristic algorithms 225 may further determine, identify, and analyze an aspect ratio of each of the symbols, according to each symbol's relative size and position within the captured layout. The heuristic algorithms 225 may then make specific deductions, such as the role of each of the symbols, according to its size, shape, and position compared to the rest of the layout. For example, the software logic may identify a vertically short, horizontally wide rectangle, and, using the definitions in data storage 130, determine that its aspect ratio within the drawing includes the entire width of the layout. Then, given its relative position within the drawing at the top of the layout, the heuristic algorithms 225 may make specific deductions in order to determine that the user intended the rectangle to be a logo or banner.

The heuristic algorithms 225 and/or stored data 230, 235 may also be configured to identify combinations of symbols and/or text, possibly embedded within other symbols. For example, as seen in FIGS. 3-5, a rectangle containing an X through the center may be identified and/or interpreted as an image or banner. Similarly, multiple parallel lines, or smaller parallel horizontally wide rectangles, inside or outside of a rectangle may represent a collection of text content. The image recognition software may further identify the relative positions of various symbols to help identify the intended layout. For example, as seen in FIG. 3, a full width rectangle including several horizontal lines or smaller skinny rectangles with it may be interpreted as a paragraph, but if one of the rectangles includes, for example, an X, and the other includes several lines, the image recognition software 225 may identify the rectangles as an image with a paragraph describing the image within the layout.

In some embodiments, the software instructions 220, 225 and/or stored data 230, 235 may identify specific types of text, such as menus, block paragraphs, outlines, bullet points, captions, headers, etc. Thus, in some non-limiting example embodiments, the instructions 220, 225 or stored data 230, 235 may define a rectangle including lines (or long thin horizontal rectangles) that may be identified and recognized as blocks of text, or as outlines of text. In other embodiments, such as that seen in FIG. 3, the layout may include a rectangle along the left side or underneath the header that includes evenly spaced text, which may be defined as a menu.

As seen in FIG. 3, various symbols within the layout may also be interpreted as GUI controls to be added to the layout. Non-limiting examples of such GUI controls seen in FIG. 3 include a downward facing arrow within a rectangle representing a dropdown box, a checkmark within a square representing a checkbox, a circle representing a radio button, a thin horizontal rectangle including a magnifying glass representing a website search, a thin horizontal rectangle including a person icon representing a directory search, etc. Other examples may include a tall rectangle centered within a long line representing a slider, a shaded or divided rectangle representing a progress bar, an underlined text representing a link, a rectangle with embedded text representing a submit or other button, or a text box, etc.

The disclosed system may then consolidate all recognized symbols to generate the specific layout features as an editable electronic document, such as a web page, email campaign, etc., including any identified GUI controls, images, color schemes, etc. in some embodiments. Software logic 220, 225 and/or stored data 230, 235 may further include instructions for combining and organizing the one or more identified symbols into a content layout for a personalized template to be used for an email campaign, web page, brochure, or any other intended electronic document layout. Utilizing these instructions, the system may then automatically generate the content layout according to each symbol's defined position in relation to itself, to other symbols, and to the layout as a whole.

In some embodiments, the software logic 220, 225 and/or stored instructions 230, 235 may further include one or more text recognition software libraries, modules, and/or engines, which may identify text within the captured layout image, as provided by the user and/or the user's team, and may insert the recognized text as content into the appropriate component of the content layout. Similarly, the disclosed system may recognize specific colors within the captured layout, and include these colors within the automatically generated content layout.

In some embodiments, the captured image may include keywords, a logo, an image (e.g., for a product), a color scheme and/or other data specific to a particular industry, organization, and/or product. In these embodiments, data storage 130 may store data associated with the industry, organization, and/or product 240 (e.g., associated images, stock text content, color schemes, previous layouts, etc.). For example, data storage 130 may store a collection of images categorized according to industry category/vertical (e.g., hammers or wrenches for a hardware or construction related industry), or may store instructions associating specific images (e.g., logos, product images), keywords, text, content, and/or color schemes with the specific industry, organization, and/or product.

Image recognition software 225 and/or data storage 130 may include instructions to attempt to match a logo or product image, stock text (e.g., a company tagline, description, or contact info), a product description, a color scheme associated with the organization or product, industry images, icons, or standard text for the industry, company, and/or product referenced in the captured layout with the data in data storage 130. If a match is found, the software logic may attempt to insert the matched data as content into the appropriate components of the content layout. Thus, as the software modules identify specific keywords, logos, color schemes, and/or layouts, the software logic may recommend various stock images, text, logos, color schemes, and/or layouts to the user, to include in their customized personalized layout, or may automatically include this content within the identified layout components.

The system may consolidate the identified layout components into a personalized electronic layout (e.g., HTML email campaign layout) representing the original sketch of the intended layout. To accomplish this, the software modules 200, 220, 225 may analyze the image, as described above, and map out the layout based on the identified content. The system may then generate a GUI based on this layout.

Once the software modules 200, 220, 225 have generated the layout template and GUI, they may further create user interactivity, allowing the user to manipulate each of one or more components within the layout template, each component representing, and containing the content associated with an identified symbol or combination of symbols. Each component may be positioned according to the relative positioning of the original captured image layout. In some embodiments (not shown in FIG. 5), each of the components may be enclosed within a rectangle shape, and allow the user to move or otherwise modify the rectangle.

In embodiments where the user previously input text, color schemes, images, etc., the software instructions may automatically insert the appropriate text, images, logos, product descriptions, color schemes, etc. In other words, in some embodiments, the layout may include all of the text input by the user when they created the user design, the colors input into the original design, colors from the logo or a product, the logo or image of the product itself, etc.

In embodiments where the logo, product, or specific text is included, the system may identify the logo, product, or specific keywords within the text content, to identify the industry, organization, or product data 240 associated with the layout in data storage 130. In some embodiments, where specific content was not already provided, the server may be configured to generate stock text or image content to the automatically generated and customized/personalized layout template, which is relevant to the identified industry, organization, or product. In some embodiments, the stock content may be provided by client 120, server 110, data storage 130, or by an external third party data feed.

The disclosed system may then update the generated GUI to include the additional functionality and content, and, where appropriate for the embodiment, transmit the GUI to client 120 for display, thereby allowing the user to edit the automatically generated content layout. Specifically, the generated GUI may be configured so that the user may confirm the correct recognition by the software, or possibly to correct errors in the interpretation of the original captured image (e.g., components in the incorrect position, or labeled as a text area when it should be an image, etc.), and rearrange the layout by re-positioning or redefining one or more of the components. In some embodiments, the source code and/or GUI for the layout template may be updated in real time as the user rearranges or otherwise updates the layout.

As seen in FIG. 5, the client application, possibly using instructions within the layout review module 215, may display the visual layout as a GUI, analogous to the original captured layout. The generated GUI may further include icons, links, or other instruction indicating the identified content type (e.g., text, image, etc.) within each layout content component, which the user may access to insert or update the content within that layout component. Thus, each of the components for the layout may be labeled with icons, links, instructions, or other indicators to show the user that the components are configured to receive an image, text, or other content.

The user GUI may include instructions, explaining to the user the indicators, icons, symbols, etc., that dictate whether the components within the layout are intended to receive images or text content, etc. Once a link or icon is selected by the user, the disclosed system may identify the type of content to be inserted into the layout component, and provide access to resources that the user may insert into the component.

For example, if the system identifies the component as a text component, a user may select a link or icon to insert text. If the user selects a portion of the layout template designated for text, the client application 200 may execute the text input module, generating and providing the user with a software GUI dialog to input text. In various embodiments, the dialog may further allow the user to access a keyboard or a voice recognition functionality within the client software 200, or to be executed on server 110. On receiving this input, one or more text entry software instructions may generate a GUI control, such as a text area, within the layout, and automatically access a keyboard or voice recognition software to generate a user interface allowing the user to input the text to be stored in the text component of the layout.

As non-limiting examples, the input text may include any form of text, including text blocks, paragraphs, outlines, bullet points, etc. As a non-limiting example, the text may describe a new product described within an email campaign, any related sales, and inform readers that the product will be released the following month. In some embodiments, the user may select the stock text content provided via recognition of a defined industry, organization, and/or product as described above.

Similarly, if the system identifies the component as an image component, the user may select a link or icon to insert an image. If the user selects a portion of the layout template designated for images, the client application may execute the image selection component, generating and providing the user with a software GUI dialog to access images.

On receiving this input, one or more image selection or capture software instructions may generate a GUI control, such as a dialog box, allowing the user to capture an image via a camera or scanning software, or to select an image from a local client machine 120 or a cloud-based solution. In some embodiments, the user may access images available on the client device 120, or the user may take pictures using the client device 120, and select them in real time. In other embodiments, the dialog may allow the user to access pictures on server 110 or otherwise in the cloud. In some embodiments, the picture may be a product being sold in an email campaign, as a non-limiting example, or may include the stock images associated with a specific industry, organization, and/or product, as described above.

The user may repeat this process for each of the layout segments, and when satisfied with the final result, submit the content layout to be stored in data storage 130.

The user changes may then be transmitted back to server 110, possibly using the data transmission module 210 in the client application 200, and server 110 may then capture and contain all this information. Server 110 may then store the layout template, which may be used, for example, for hosting a website (which may be hosted on server 110) or sending an email campaign. In some embodiments, once the email campaign is stored and approved by the user, the server 110 may have functionality to automatically submit the campaign to an email distribution list, for example. The user may then access this template to complete an email campaign, an HTML web page or site, a brochure, etc.

Figure 6:
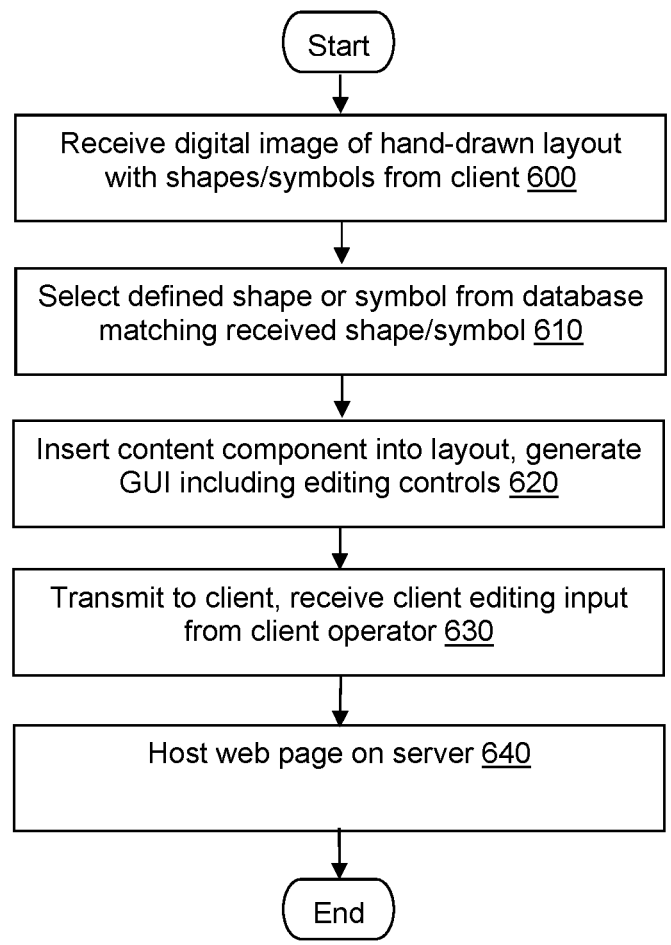
FIG. 6 is a flow diagram illustrating a possible embodiment of creating electronic layouts based on visual input.

FIG. 6 is a flow diagram representing an embodiment of the disclosed invention. In FIG. 6, a server hardware computing device is coupled to a network, and comprises at least one processor executing specific computer executable instructions within a memory that, when executed, cause the system to receive a digital image, captured by and transmitted from a client hardware computing device coupled to the network, the digital image including a hand-drawn layout of a web page comprising at least one received shape or symbol at a position within the hand-drawn layout (Step 600). In step 610, the server selects, from a database coupled to the network, a defined shape or symbol, within a dictionary defining a plurality of shapes or symbols, matching the at least one received shape or symbol, and a content component, for incorporation into a web page, associated in the database with the defined shape or symbol. In step 620, the server generates a web page layout including the content component, and inserts, into the web page layout, a graphical user interface (GUI) including at least one GUI control configured to receive, from an operator of the client hardware computing device, at least one edit to the web page layout. In step 630, the server transmits the web page layout to the client hardware computing device, and receives, from the client hardware computing device via the GUI, a user input data from the operator. In step 640, the server hosts a web page including the web page layout.

Figure 7:
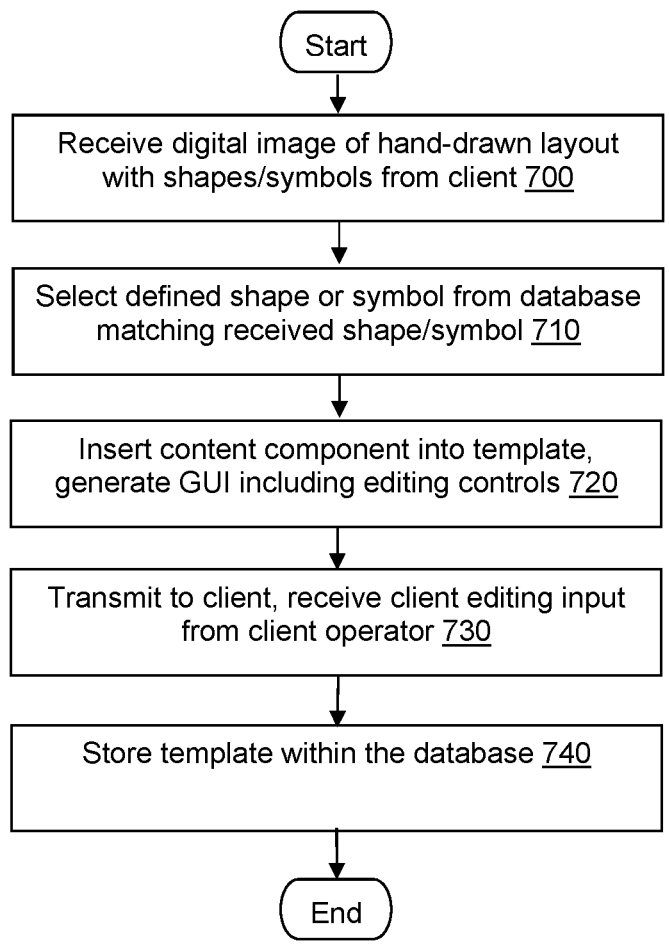
FIG. 7 is a flow diagram illustrating a possible embodiment of creating electronic layouts based on visual input.

FIG. 7 is a flow diagram representing an embodiment of the disclosed invention. In FIG. 7, a server hardware computing device is coupled to a network, and comprises at least one processor executing specific computer executable instructions within a memory that, when executed, cause the system to receive a digital image, captured by and transmitted from a client hardware computing device coupled to the network, the digital image including a hand-drawn layout of an email campaign, or a desktop publishing document, comprising at least one received shape or symbol at a position within the hand-drawn layout (Step 700). In step 710, the server selects, from a database coupled to the network, a defined shape or symbol, within a dictionary defining a plurality of shapes or symbols, matching the at least one received shape or symbol, and a content component, for incorporation into the email campaign or the desktop publishing document, associated in the database with the defined shape or symbol. In step 720, the server generates a template, for the email campaign or the desktop publishing document, including the content component, and inserts, into the template, a graphical user interface (GUI) including at least one GUI control configured to receive, from an operator of the client hardware computing device, at least one edit to the template. In step 730, the server transmits the template to the client hardware computing device, and receives, from the client hardware computing device via the GUI, a user input data from the operator. In step 740, the server stores the template within the database.

Figure 8:
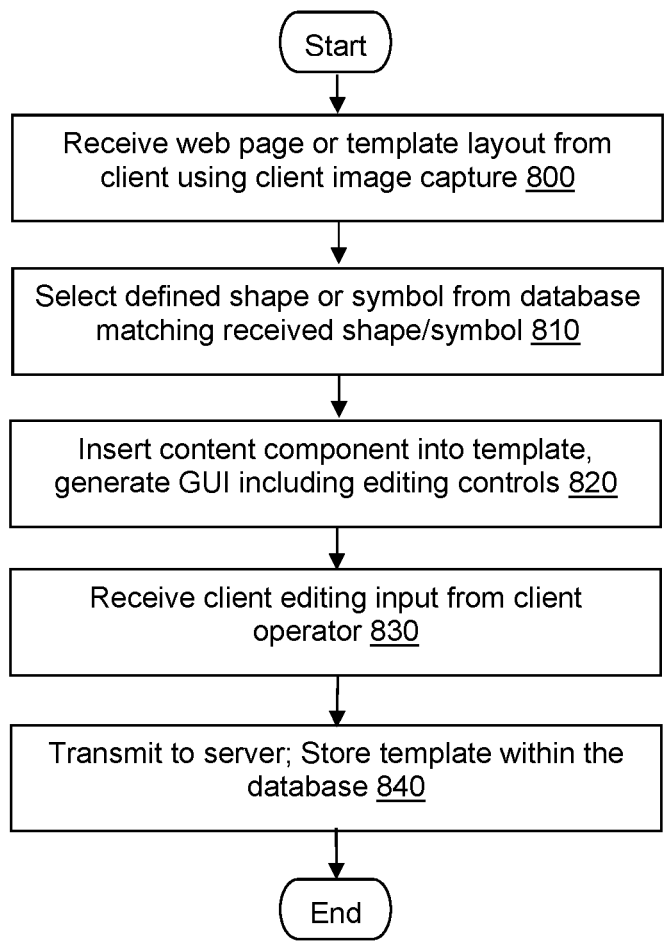
FIG. 8 is a flow diagram illustrating a possible embodiment of creating electronic layouts based on visual input.

FIG. 8 is a flow diagram representing an embodiment of the disclosed invention. In FIG. 8, a server hardware computing device is coupled to a network, and comprises at least one processor executing specific computer executable instructions within a memory that, when executed, cause the system to receive, from a client hardware computing device coupled to the network, a template or a layout for a web page, an email campaign, or a desktop publishing document, wherein the client hardware computing device executes computer-executable instructions causing the system to capture a digital image including a hand-drawn representation of the template or the layout and comprising at least one received shape or symbol at a position within the hand-drawn representation (Step 800). In step 810, the client selects, from a plurality of data on the client hardware computing device, a defined shape or symbol, within a dictionary defining a plurality of shapes or symbols, matching the at least one received shape or symbol, and a content component, for incorporation into the layout or the template, associated, within the plurality of data, with the defined shape or symbol. In step 820, client generates the layout or the template including the content component, and inserts, into the layout or the template, a graphical user interface (GUI) including at least one GUI control configured to receive, from an operator of the client hardware computing device, at least one edit to the layout or the template. In Step 830, the client receives, via the GUI, a user input data from the operator. In step 840, the client transmits the layout or the template to the server hardware computing device, which stores the layout or the template on the server hardware computing device or within a database coupled to the network.

The steps included in the embodiments illustrated and described in relation to FIGS. 1-8 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising a server hardware computing device coupled to a network and comprising at least one processor executing computer-executable instructions within a memory, which, when executed, cause the system to:
receive, from a client hardware computing device coupled to the network, a template or a layout for a web page, an email campaign, or a desktop publishing document, wherein the client hardware computing device executes computer-executable instructions causing the system to:
capture a digital image including a hand-drawn representation of the template or the layout and comprising at least one received shape or symbol at a position within the hand-drawn representation;
identify, within the digital image:
an image or a text string; and
an aspect ratio according to a relative size or position of the at least one received shape or symbol within the hand-drawn representation;
select, from a plurality of data on the client hardware computing device:
a defined shape or symbol, within a dictionary defining a plurality of shapes or symbols, matching the at least one received shape or symbol;
an industry associated in the database with the image or the text string identified; and
a content component, for incorporation into the layout or the template, associated, within the plurality of data, with:
the defined shape or symbol;
the industry associated with the image or the text string; and
the aspect ratio and the relative size and position of the at least one received shape or symbol;
generate the layout or the template including the content component;
insert, into the layout or the template, a graphical user interface (GUI) including at least one GUI control configured to receive, from an operator of the client hardware computing device, at least one edit to the layout or the template;
receive, via the GUI, a user input data from the operator; and
transmit the layout or the template to the server hardware computing device; and
store the layout or the template on the server hardware computing device or within a database coupled to the network.

2. The system of claim 1, wherein the digital image is captured using a digital camera, a scanner, or a screen capture.

3. The system of claim 1, wherein, subsequent to a capture of the digital image, the computer-executable instructions on the client hardware computing device cause the system to:
determine whether the image is clear; and
responsive to a determination that the image is not clear, sharpen the image.

4. The system of claim 1, wherein the received shape or symbol and the defined shape or symbol comprises a rectangle.

5. The system of claim 1, wherein the hand-drawn representation comprises a plurality of shapes or symbols in a plurality of positions within the hand-drawn representation.

6. The system of claim 1, wherein the received shape or symbol is identified according to a relative position within the hand-drawn representation.

7. The system of claim 1, wherein the received shape or symbol represents a text content, a color, or a GUI control.

8. The system of claim 1, wherein the user input data comprises a data indicating an approval, by the operator, of the layout or the template.

9. The system of claim 1, wherein the user input data comprises a data received from a GUI control within the GUI and configured to insert, into the layout or the template, a text, a color, or a layout GUI control.

10. The method of claim 1, wherein the user input data comprises a data indicating an approval, by the operator, of the layout or the template.

11. A method, comprising:

receiving, by a server hardware computing device coupled to a network and comprising at least one processor executing computer-executable instructions within a memory, from a client hardware computing device coupled to the network, a template or a layout for a web page, an email campaign, or a desktop publishing document, wherein the client hardware computing device executes computer-executable instructions causing the client to:

capture a digital image including a hand-drawn representation of the template or the layout and comprising at least one received shape or symbol at a position within the hand-drawn representation;

identify, within the digital image:
an image or a text string; and
an aspect ratio according to a relative size or position of the at least one received shape or symbol within the hand-drawn representation;

select, from a plurality of data on the client hardware computing device:
a defined shape or symbol, within a dictionary defining a plurality of shapes or symbols, matching the at least one received shape or symbol;
an industry associated in the database with the image or the text string identified; and
a content component, for incorporation into the layout or the template, associated, within the plurality of data, with:
the defined shape or symbol;
the industry associated with the image or the text string; and
the aspect ratio and the relative size and position of the at least one received shape or symbol;

generate the layout or the template including the content component;

insert, into the layout or the template, a graphical user interface (GUI) including at least one GUI control configured to receive, from an operator of the client hardware computing device, at least one edit to the layout or the template;

receive, via the GUI, a user input data from the operator; and transmit the layout or the template to the server hardware computing device; and storing, by the server hardware computing device, the layout or the template on the server hardware computing device or within a database coupled to the network.

12. The method of claim 11, wherein the digital image is captured using a digital camera, a scanner, or a screen capture.

13. The method of claim 11, further comprising the steps, subsequent to a capture of the digital image, of:
determining whether the image is clear; and
responsive to a determination that the image is not clear, sharpening the image.

14. The method of claim 11, wherein the received shape or symbol and the defined shape or symbol comprises a rectangle.

15. The method of claim 11, wherein the hand-drawn representation comprises a plurality of shapes or symbols in a plurality of positions within the hand-drawn representation.

16. The method of claim 11, wherein the received shape or symbol is identified according to a relative position within the hand-drawn representation.

17. The method of claim 11, wherein the received shape or symbol represents a text content, a color, or a GUI control.

18. The method of claim 11, wherein the user input data comprises a data received from a GUI control within the GUI and configured to insert, into the layout or the template, a text, a color, or a layout GUI control.

* * * * *